United States Patent
Wu

(10) Patent No.: US 8,666,410 B2
(45) Date of Patent: Mar. 4, 2014

(54) METHOD OF CONTROLLING CELL SELECTION FOR A WIRELESS COMMUNICATION SYSTEM AND RELATED DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 569 days.

(21) Appl. No.: 12/234,716

(22) Filed: Sep. 22, 2008

(65) Prior Publication Data
US 2010/0075670 A1   Mar. 25, 2010

(51) Int. Cl.
*H04W 4/00* (2009.01)

(52) U.S. Cl.
USPC ........ 455/435.2; 455/434; 455/518; 455/519; 455/525; 370/340

(58) Field of Classification Search
USPC ........ 455/518, 519, 525, 434, 435.2; 370/340
See application file for complete search history.

(56) References Cited

U.S. PATENT DOCUMENTS

| | | | |
|---|---|---|---|
| 5,946,632 A | 8/1999 | Yi | |
| 7,526,289 B2 | 4/2009 | Schwarz | |
| 2002/0106997 A1 | 8/2002 | Barber | |
| 2006/0111110 A1 | 5/2006 | Schwarz | |
| 2007/0054665 A1 | 3/2007 | Elkarat | |
| 2007/0070947 A1* | 3/2007 | Park | 370/331 |
| 2008/0194253 A1 | 8/2008 | Kuo | |
| 2008/0220782 A1* | 9/2008 | Wang et al. | 455/436 |
| 2008/0227447 A1 | 9/2008 | Jeong | |
| 2008/0268766 A1* | 10/2008 | Narkmon et al. | 455/1 |
| 2009/0047960 A1* | 2/2009 | Gunnarsson et al. | 455/436 |
| 2009/0075650 A1 | 3/2009 | Jung | |
| 2009/0092097 A1* | 4/2009 | Nylander et al. | 370/331 |
| 2009/0098873 A1* | 4/2009 | Gogic | 455/436 |
| 2009/0104905 A1* | 4/2009 | DiGirolamo et al. | 455/434 |
| 2009/0238117 A1 | 9/2009 | Somasundaram | |
| 2009/0239533 A1* | 9/2009 | Somasundaram et al. | 455/434 |
| 2009/0305699 A1* | 12/2009 | Deshpande et al. | 455/434 |
| 2010/0075698 A1 | 3/2010 | Rune | |
| 2010/0110945 A1* | 5/2010 | Koskela et al. | 370/310 |
| 2010/0113020 A1 | 5/2010 | Subramanian | |
| 2010/0130197 A1 | 5/2010 | Wu | |

(Continued)

FOREIGN PATENT DOCUMENTS

| CN | 1685754 A | 10/2005 |
|---|---|---|
| CN | 101072433 A | 11/2007 |

(Continued)

OTHER PUBLICATIONS

Office action mailed on Mar. 1, 2012 for the U.S. Appl. No. 12/545,854, filed Aug. 23, 2009, p. 1-36.

(Continued)

*Primary Examiner* — Amancio Gonzalez
(74) *Attorney, Agent, or Firm* — Winston Hsu; Scott Margo

(57) ABSTRACT

A method of controlling CSG, known as closed subscriber group, cell selection for a wireless communication system is provided. The wireless communication system includes a network and a user equipment including a whitelist capable of providing a list of accessible CSG cells. The method includes updating the whitelist when the user equipment subscribes to a CSG cell that is not included in the whitelist or does not subscribe to a CSG cell in the whitelist.

13 Claims, 10 Drawing Sheets

(56) References Cited

U.S. PATENT DOCUMENTS

| | | | |
|---|---|---|---|
| 2010/0165867 A1* | 7/2010 | Nylander et al. | 370/252 |
| 2010/0197311 A1* | 8/2010 | Walldeen et al. | 455/444 |
| 2010/0227641 A1 | 9/2010 | Muller | |
| 2010/0240366 A1 | 9/2010 | Bi | |
| 2010/0323663 A1* | 12/2010 | Vikberg et al. | 455/410 |
| 2011/0045830 A1 | 2/2011 | Wu | |

FOREIGN PATENT DOCUMENTS

| | | |
|---|---|---|
| CN | 101227705 A | 7/2008 |
| CN | 101309499 A | 11/2008 |
| CN | 101321372 A | 12/2008 |
| TW | 396698 | 7/2000 |
| WO | 2008108716 A1 | 9/2008 |
| WO | 2009115897 A1 | 9/2009 |

OTHER PUBLICATIONS

Office action mailed on Apr. 7, 2011 for the U.S Appl. No. 12/324,845, filed Nov. 27, 2008, p. 1-14.

European patent application No. 11002413.0, European application filing date: Sep. 11, 2009, European Search Report mailing date: Jul. 5, 2011.

Nokia Corporation, Nokia Siemens Networks, "Simple CSG for REL8", 3GPP TSG-RAN WG2 Meeting # 62, R2-082551, May 5-9, 2008, Kansas City, USA, XP050140223, p. 1-6.

3GPP TS 36.304 V8.2.0 (May 2008), "3rd Generation Partnership Project; Technical Specification Group Radio Access Network; Evolved Universal Terrestrial Radio Access (E-UTRA); User Equipment (UE) procedures in idle mode (Release 8)", XP050377594, p. 1-27.

ETSI TS 136 300 V8.5.0 (Jul. 2008), "Universal Mobile Telecommunications System (UMTS);Evolved Universal Terrestrial Radio Access (E-UTRA) and Evolved Universal Terrestrial Radio Access (E-UTRAN); Overall description; Stage 2 (3GPP TS 36.300 version 8.5.0 Release 8)", XP014042193, cover page + p. 1-137.

Office action mailed on Jul. 10, 2012 for the U.S. Appl. No. 12/324,845, filed Nov. 27, 2008, p. 1-23.

European patent application No. 11002411.4, European application filing date: Sep. 11, 2009, European Search Report mailing date: Jul. 6, 2011.

3GPP TR 24.801 V2.0.0 (Sep. 2008), "3rd Generation Partnership Project; Technical Specification Group Core Network and Terminals; 3GPP System Architecture Evolution; CT WG1 Aspects (Release 8)", XP050365684, p. 1-217.

Huawei, "CSG impacts on EMM procedures", 3GPP TSG CT WG1 Meeting#55, C1-083438, Aug. 18-22, 2008, Budapest, Hungary, XP050308633, p. 1-3.

Nokia, Nokia Siemens Networks, "Access control for CSG cells", 3GPP TSG-RAN WG2 Meeting#58 bis, R2-072404, Jun. 25-29, 2007, Orlando, USA, XP050135242, p. 1-4.

Ericsson, "Home cell deployments / CSG". 3GPP TSG CT WG1 Meeting#49, C1-072371, Oct. 8-12, 2007, Kobe, Japan, XP050026517, p. 1-4.

TSG RAN WG2, "LS on CSG requirements for UTRA/E-UTRA", 3GPP TSG RAN WG2 Meeting#61bis, Mar. 31-Apr. 4, 2008, Shenzhen, China, XP050019774, p. 1-3.

Qualcomm Europe, "New reject cause for NAS level CSG control for HNB", 3GPP TSG CT WG1 Meeting#55, C1-083103, Aug. 18-22, 2008, Budapest, Hungary, XP050308339, p. 1-3.

Office action mailed on Sep. 12, 2012 for the U.S. Appl. No. 12/545,854, filed Aug. 23, 2000, p. 1-24.

3GPP, 3GPP TR 24.801 V0.5.1 (Dec. 2007) "3GPP Technical Specification Group Core Network and Terminals, CT WG1 Aspects (Release 8)", Dec. 2007.

3GPP, 3GPP TSG RAN2#60bis R2-080002 "CSG and idle mode mobility", Jan. 2008.

Office action mailed on Aug. 24, 2012 for the Taiwan application No. 098131900, filed Sep. 22, 2009, p. 1-6.

Office action mailed on May 25, 2011 for the China application No. 200910178607,8, filing date Sep. 22, 2009, p. 1-6.

Office action mailed on Jan. 31, 2012 for the China application No. 200910178607.8, filing date Sep. 22, 2009, p. 1-4.

Huawei: "A method of white list management", 3GPP Draft, 3GPP TSG CT WG1 Meeting #55, C1-083297 (Revision of 3281), Aug. 18-22, 2008, XP050308514, Budapest, Hungary.

Telecom Italia et al: "Pseudo-CR on Allowed CSG List update", 3GPP Draft, 3GPP TSG CT WG1 Meeting #55, C1-083427 (was C1-083096), Aug. 18-22, 2008, XP050308622, Budapest, Hungary.

Qualcomm Europe: "Provisioning of a UE's white list for CSG Cells", 3GPP Draft, 3GPP TSG CT WG1 Meeting #55, C1-083102, Aug. 18-22, 2008, XP050308779, Budapest, Hungary.

T-Mobile: "Essential correction to manual CSG selection", 3GPP Draft, 3GPP TSG-SA1 #40, S1-082076, Jul. 21-25, 2008, XP050228592, Sophia Antipolis, France.

Office action mailed on Oct. 17, 2012 for the Taiwan application No. 098129229, filing date Aug. 31, 2009, p. 1-6.

Office action mailed on Mar. 26, 2013 for U.S. Appl. No. 12/545,854, filed Aug. 23, 2009, p. 1-27.

Qualcomm Europe, "Manual CSG Selection across PLMNS", 3GPP TSG-SA1 #43, S1-084158, Miami, FL. Nov. 17-21, 2008.

Vodafone, "Protecting the allowed CSG list", 3GPP TSG CT WG1 Meeting #57, C1-090706, San Antonio (TX), USA, Feb. 9-19, 2009.

Nokia, Nokia Siemens Networks, "Reselection handling towards non-allowed CSG cell", 3GPP TSG-RAN WG4 Meeting #48bis, R4-082447, Edinburgh, United Kingdom, Sep. 29-Oct. 3, 2008.

Office action mailed on Aug. 5, 2013 for the China application No. 201110356838.0, filing date Sep. 22, 2009, p. 1-12.

3GPP TS 22.011 V8.4.1 (Jun. 2008), "3rd Generation Partnership Project; Technical Specification Group Services and System Aspects; Service accessibility (Release 8)", Jun. 30, 2008, p. 1-22.

Office action mailed on Oct. 23, 2013 for the Taiwan application No. 098129232, filing date Aug. 31, 2009, p. 1-17.

* cited by examiner

METHOD OF CONTROLLING CELL SELECTION FOR A WIRELESS COMMUNICATION SYSTEM AND RELATED DEVICE

BACKGROUND OF THE INVENTION

1. Field of the Invention

The present invention relates to methods and devices utilized in a wireless communication system, and more particularly, to methods and devices utilized in the wireless communication system for controlling cell selection.

2. Description of the Prior Art

A System Architecture Evolution (SAE) system, set forth by 3GPP (3rd Generation Partnership Project) is a new core network architecture for UMTS (Universal Mobile Telecommunications System), addressing cost-efficient deployment and operations for mass-market usage of IP services. The main network evolutions include meeting the targets for a radio-interface of a long term evolution (LTE) system, simplified network architecture, an All-IP Network, only packet switched means for all services, no circuit switching, and support for mobility and service continuity between heterogeneous access networks, such as between 2G/3G, LTE, non-3GPP access systems.

The SAE core network includes an MME (Mobility Management Entity), an S-GW (Serving Gateway) and a P-GW (PDN gateway). The MME is a control plane entity that manages the attachment to the network, the authentication of the user equipment (UE), and interfaces an E-RAN (evolved radio access network) for the creation of relevant radio bearers.

Functions of the SAE include the Non-Access-Stratum (NAS) functions to be performed by the UE in idle mode, the NAS signalling procedures between the UE and an evolved packet core network (EPC) via an E-UTRAN (evolved UMTS radio access network) including eNBs (evolved Node-Bs), and layer 3 signalling procedures between the UE and the EPC via non-3GPP access networks.

Under NAS functions, home cell deployments are defined as a single eNB used in a building or a small group of cells, e.g. in a campus deployment. Access to home cells is restricted to particular subscribers. In home cell deployments, a CSG (closed subscriber group) cell as part of the PLMN (public land mobile network) is only suitable for a UE if an id of the CSG cell is in a whitelist of the UE. Coverage of the CSG cell may be home, building, campus coverage, etc. The whitelist is a list of CSG cell ids where the UE is allowed to camp.

For home cell deployments, two options A and B provide different usage of the whitelist. In addition, an attach procedure and a tracking area updating (TAU) procedure, are both EMM (EPS Mobility Management) specific procedures as part of the NAS signalling procedures, and can be used for updating the whitelist of the UE.

In the option A, a CSG area is defined as a tracking area (TA) that consists of a cell or group of cells to which access is restricted to a defined group of users. A single cell can only belong to one TA or one CSG-TA. To achieve a concept of "registration to multiple tracking areas", the MME can assign several TAs and CSG-TAs to the UE. As part of the attach and/or TAU procedures, the MME may provide the UE with one or more TACs (TA cells) identifying a CSG or non-CSG tracking area. If the TA identifies a CSG, the UE adds this identity to the whitelist. The MME indicates the UE whether or not a CSG, to which the UE is subscribed, belongs to a current registration area assigned to the UE, and if it does, the UE does not trigger the tracking area update when entering the CSG.

In addition, the MME checks if the CSG TA identifier belongs to the ones subscribed by the UE or not. If the CSG TA identifier does not match with the subscribed ones, the MME rejects the network access initiated by the UE.

In the option B, a CSG area consists of a cell or group of cells to which access is restricted to a defined group of users. A single cell can only belong to one CSG area or one non-CSG area. To achieve a concept of "registration to multiple tracking areas", the MME assigns several TAs to the UE. The CSG cell area identity consists of a TAI+a cell identity code. The list of allowed CSG cell area identities (whitelist) shall be stored in the UICC. The MME may provide the whitelist in, for example, a similar way as today's Equivalent PLMN list or the tracking area list (e.g., acceptance message of the attach/tracking area updating procedures). The UE considers its whitelist as valid until it receives a new list in the next EMM procedure or it is commanded by the network to delete all entries in the whitelist. The UE shall treat all CSG cells where the UE does not belong to the associated CSG as though they are NOT a suitable cell.

An eNB, which belongs to a CSG area, sends the CSG cell area identity, i.e., TAI plus (parts of) cell identity, to the MME whenever authorization needs to be checked in the MME. On receipt of a new cause value the UE removes CSG cell area identity (outdated information) from the stored whitelist. This prevents non-allowed UEs from accessing cells indicated as restricted.

In the option A, the whitelist consists of CSG-TAs, whereas the whitelist in the option B consists of cell identities including TAs and cell Ids.

In the prior art, two problems of cell selection are described as follows.

The first problem is that, in the option A or B, the whitelist is updated by the attach or tracking area updating procedure. However, the attach and tracking area updating procedures can only be initiated by the UE. The initiating criteria of the attach procedure is the UE attempting to enter an EMM-CONNECTED mode from the in an EMM-IDLE mode. The tracking area updating procedure is used for the following purposes of normal tracking area updating, periodic tracking area updating and intersystem change.

As can be seen from the above, the UE only initiates the attach or tracking area updating procedure when certain conditions are met. This means the UE cannot initiates the attach or tracking area updating procedure anytime. Besides, the network only can update the whitelist of a UE when the UE performs the attach or tracking area updating procedure.

The UE cannot access a new subscribed CSG cell immediately because the UE has to wait for completion of whitelist updating that adds this CSG cell to the whitelist through the attach procedure or tracking area updating procedure. Even the UE finds the new subscribed CSG cell is the best cell for cell reselection, this CSG cell cannot be selected because this cell is not in whitelist.

The second problem is described as bellow. According to the prior art, the cell measurement and reselection rules for macro cell are applied for CSG cell as well. Besides, the user pays less money if the UE accesses the service via the subscribed CSG cell than via a non-CSG cell. When a UE subscribed CSG cell, the UE camps on the macro cell and also stays in coverage of a CSG cell deployed in coverage of the macro cell, the UE is not able to reselect this CSG cell when none of the cell reselection criteria is met or even the UE does not measure this CSG cell since measurement criteria are not met. In this situation, the UE can only continue receiving service via the macro cells even though the UE has entered the CSG cell coverage.

In the abovementioned problems of the prior art, the UE cannot select or access a suitable CSG cell immediately when a suitable CSG cell is found or subscribed. The communication quality is not optimized.

In addition to the abovementioned problems, the whitelist of the UE possibly includes a listed CSG cell that is not subscribed by the UE. The related specification does not specify actions of dealing with the whitelist. Furthermore, the specification specifies no actions for the UE or the network about a situation where the UE camps on the listed CSG cell that is not subscribed. In this situation, the CSG cell can be misused by the non-subscriber UE.

SUMMARY OF THE INVENTION

The present invention therefore provides a method and related apparatus of controlling CSG cell selection for a wireless communication system to solve the abovementioned problems.

The present invention discloses a method of controlling CSG cell selection for a wireless communication system including a UE and a network. The UE includes a whitelist capable of providing a list of accessible CSG cells. The method includes updating the whitelist when the UE subscribes to a CSG cell that is not included in the whitelist or does not subscribe to a CSG cell in the whitelist.

The present invention further discloses a method of controlling CSG cell selection for a UE of a wireless communication system. The UE comprises a whitelist providing a list of accessible CSG cells. The method comprises periodically searching the CSG cells in the whitelist according to a searching period when the UE camps on a macro cell and does not meet any of measurement criteria for CSG cell measurement The present invention further discloses a method of controlling CSG cell selection for a UE of a wireless communication system. The UE comprises a whitelist capable of providing a list of accessible CSG cells. The method comprises performing CSG cell searching when a new CSG cell is added to the whitelist.

The present invention further discloses a method of controlling CSG cell selection for a UE of a wireless communication system. The UE comprises a whitelist capable of providing a list of accessible CSG cells. The method comprises performing cell selection to select a cell to camp on when a CSG cell that the UE currently camps on is removed from the whitelist The present invention further discloses a method of controlling CSG cell selection for a UE of a wireless communication system comprising a network. The UE includes a whitelist capable of providing a list of accessible CSG cells. The method includes receiving a paging message from the network when the UE camps on a CSG cell in the whitelist and does not subscribe to the CSG cell, initiating a service request procedure when the paging message is received, through the service request procedure receiving a SERVICE REJECT message comprising a reject cause value from the network, and then searching a cell other than the CSG cell when the reject cause value of the SERVICE REJECT message is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
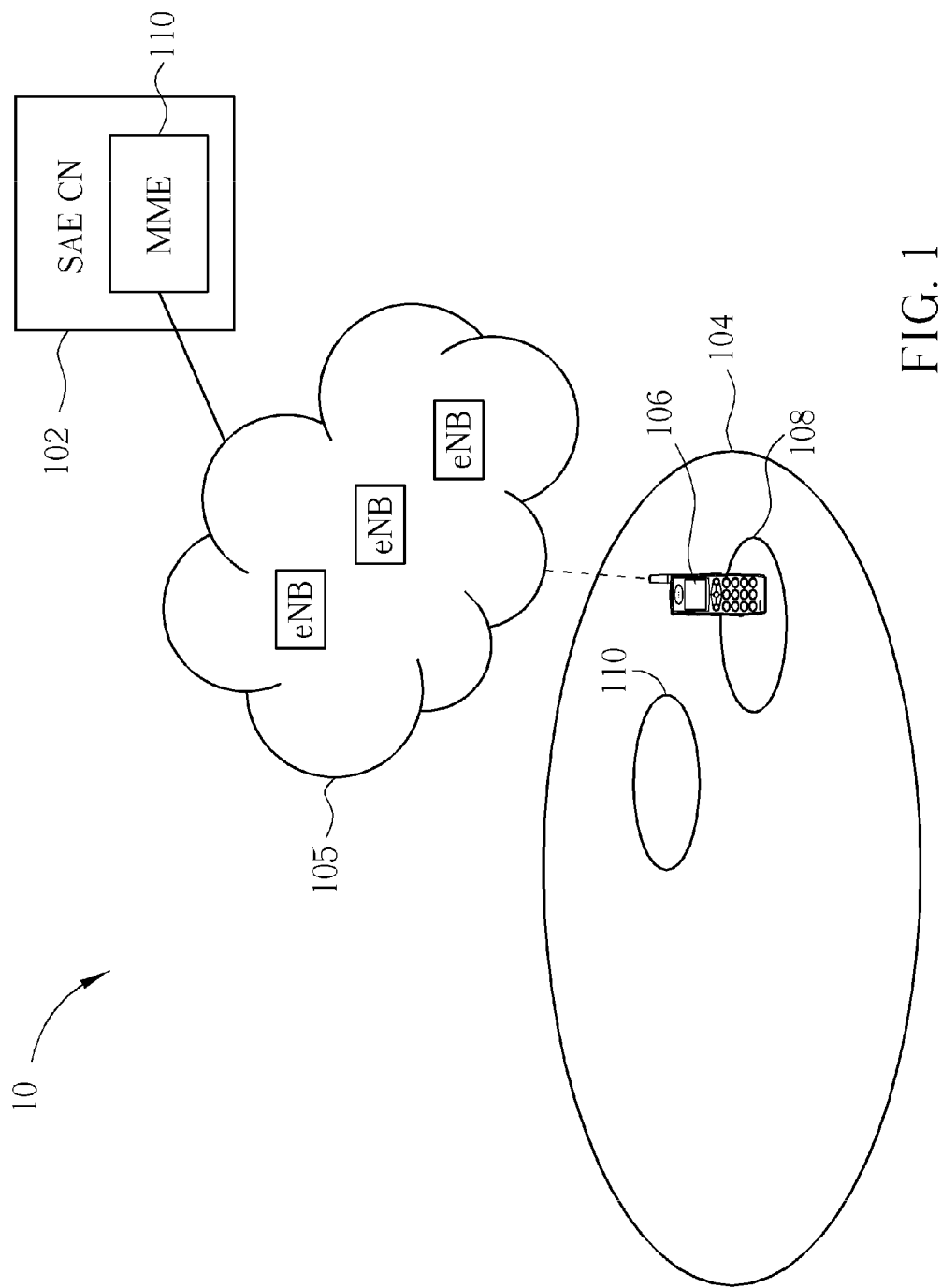
FIG. 1 is a schematic diagram of a wireless communication system.

Please refer to FIG. 1, which is a schematic diagram of a wireless communication system 10. The wireless communication system 10 includes a System Architecture Evolution (SAE) core network (CN) 102, a macro cell 104, an E-UTRAN (evolved UMTS radio access network) 105 and a user equipments (UE) 106. The macro cell 104 includes CSG (closed subscriber group) cells 108 and 110. For simplicity, only a UE 106 is shown in FIG. 1. For the UE 106 subscribing CSG services, coverage of the macro cell 104 other than coverage of the CSG cells 108 and 110 is seen as non-CSG area. Coverage of the CSG cells 108 and 110 is smaller than coverage of the macro cell 104 and may be home, building, campus coverage, etc. The SAE CN 102 includes a MME (Mobility Management Entity) 110, which is a control plane entity for performing Non-Access-Stratum (NAS) communication with the UE 106 through a radio interface established between the UE 106 and one or more evolved Node-Bs (e-Node Bs), which is a part of the E-UTRAN 105. For NAS usage about CSG cell selection, the UE 106 stores a whitelist capable of providing a list of CSG cells which the UE 106 is allowed to access. That is, the whitelist can include a list of CSG cells or nothing, depended on configuration sent by the MME 110.

In addition, an attach procedure and a tracking area updating procedure both initiated by a UE can be used for updating the whitelist. Furthermore, measurement criteria are provided in wireless communication system 10, allowing the UE to reselect a more suitable serving cell when any of the measurement criteria is met.

Figure 2:
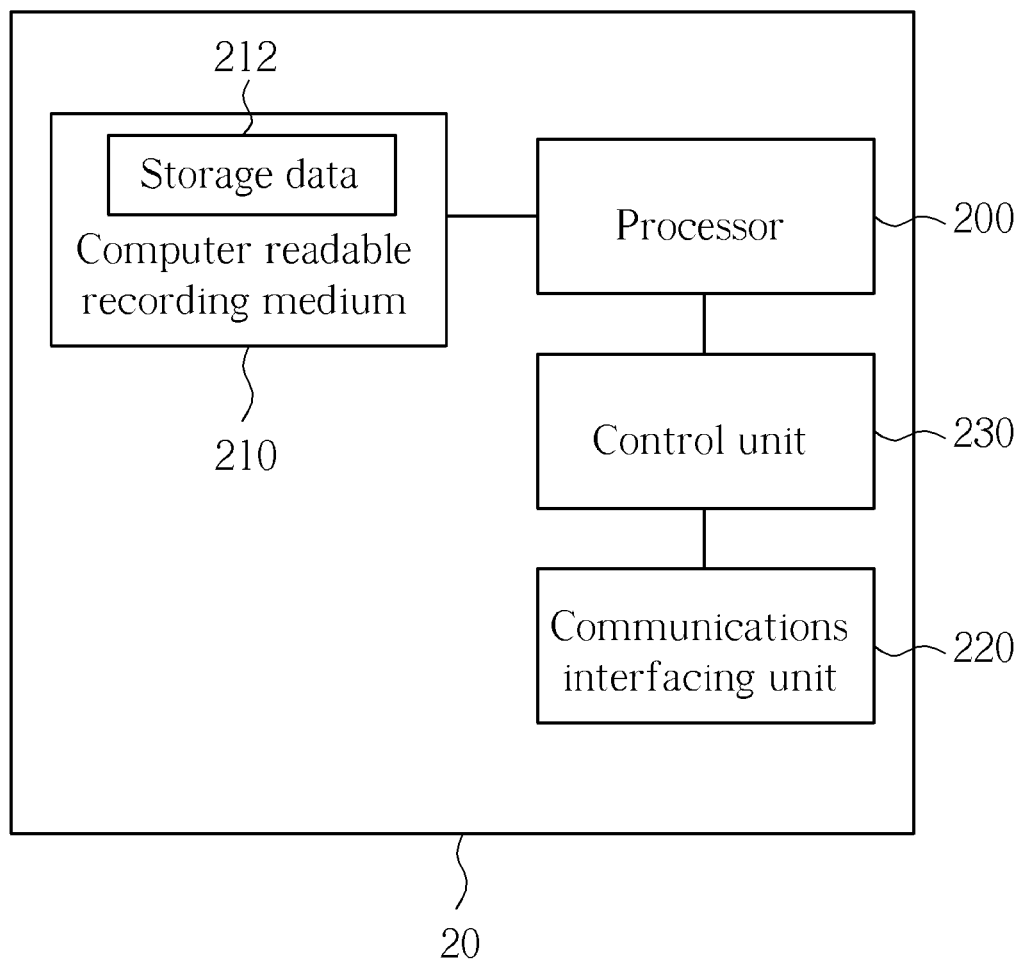
FIG. 2 is a schematic diagram of a communication device according to embodiments of the present invention.

Please refer to FIG. 2, which illustrates a schematic diagram of a communication device 20 according to embodiments of the present invention. The communication device 20 can be a UE or a MME shown in FIG. 1 and includes a processor 200, a computer readable recording medium 210, a communication interfacing unit 220 and a control unit 230. The computer readable recording medium 210 is any data storage device that stores storage data 212, including program code and NAS parameters, and the storage data 212 is thereafter read and processed by the processor 200. Examples of the computer readable recording medium include read-only memory (ROM), random-access memory (RAM), CD-ROMs, magnetic tapes, floppy disks, optical data storage devices, and carrier waves (such as data transmission through the Internet). When the communication device 20 is used in the UE, the stored NAS parameters include the whitelist. The control unit 230 controls the communication interfacing unit 220 and related operations and states of the communication device 20 according to processed results of the process 200. The communication interfacing unit 220 is responsible for exchanging signals with a peer communication device which represents a communication device performs functions of a peer communication protocol. The communication device 20 can be the UE 106 or the MME 110, and thereby the corresponding communication interfacing unit 220 is realized by different interfacing device. When the communication device 20 is used as the UE 106, the communication interfacing unit 220 is a radio transceiver for wirelessly communicating with the e-Node Bs. When the communication device 20 is used as the MME 110, the communication interfacing unit 220 can be an Ethernet networking device exchanging NAS signals with the UE 106 through the e-Node Bs.

Figure 3:
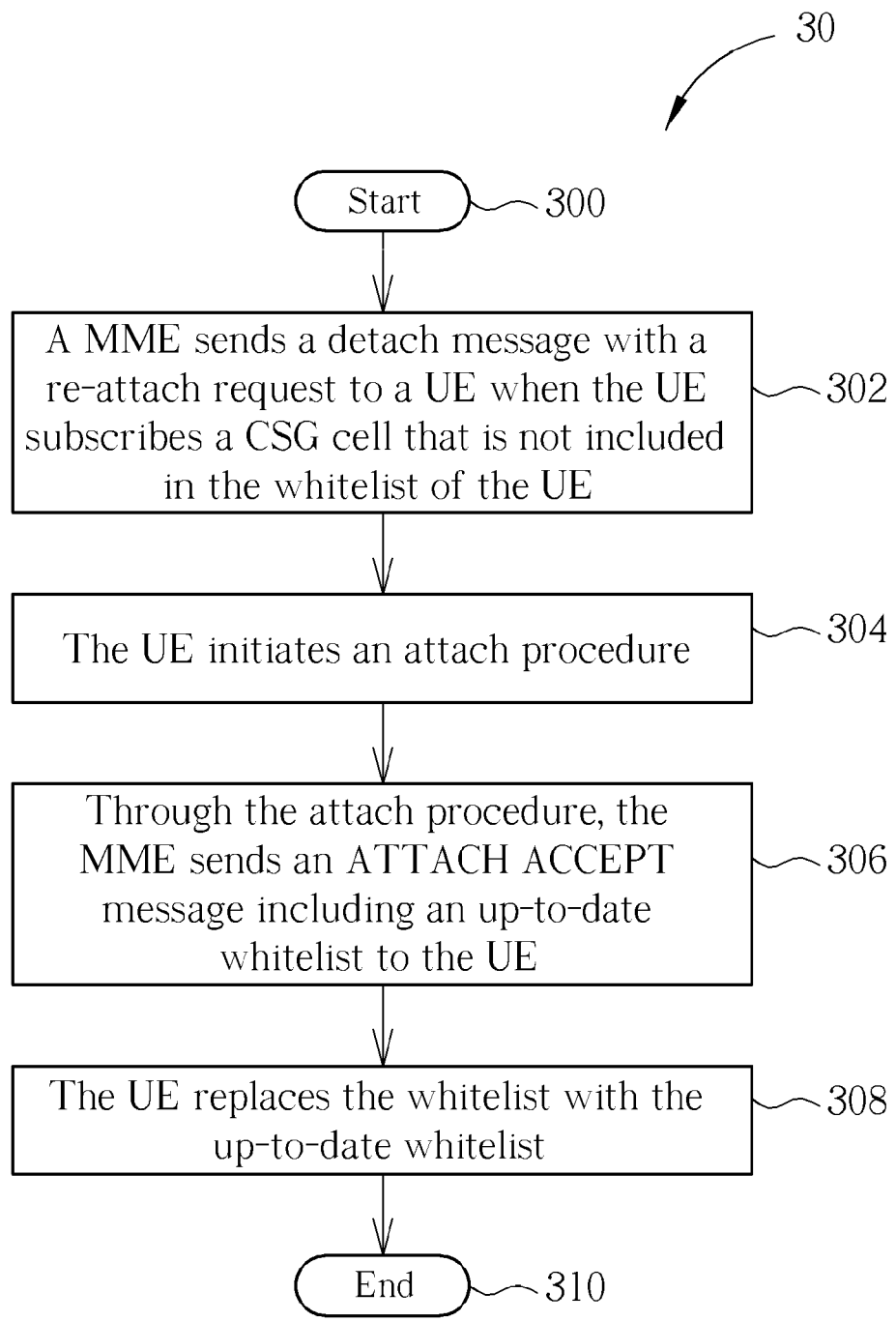
FIG. 3 is a flowchart of a process according to an embodiment of the present invention.

Please refer to FIG. 3, which illustrates a flowchart of a process 30 according to an embodiment of the present invention. The process 30 is applied to the NAS functions between a UE (ex. the UE 106) and a network (ex. the MME 110) for controlling CSG cell selection and can be compiled into the program code of the storage data 212 stored in the computer readable recording medium 210. The process 30 includes the following steps:

Step 300: Start.

Step 302: An MME sends a detach message with a re-attach request to a UE when the UE subscribes a CSG cell that is not included in the whitelist of the UE.

Step 304: The UE initiates an attach procedure.

Step 306: Through the attach procedure, the MME sends an ATTACH ACCEPT message including an up-to-date whitelist to the UE.

Step 308: The UE replaces the whitelist with the up-to-date whitelist.

Step 310: End.

According to the process 30, the embodiment of the present invention requires the MME to send a detach message with a re-attach request to the UE when the UE subscribes a CSG cell that is not included in the whitelist of the UE. Then, the UE initiates the attach procedure by sending an ATTACH REQUEST message to the MME. In response to ATTACH REQUEST message, the MME creates the up-to-date whitelist including the original CSG cell list of the UE and the CSG cell that is not included in the whitelist. The ATTACH ACCEPT message including the up-to-date whitelist is then sent to the UE. Finally, the UE replaces the whitelist with the up-to-date whitelist. Therefore, the UE has immediate access to the CSG cell that is not included in the whitelist of the UE.

Through the process 30, the whitelist is updated when the UE subscribes to the CSG cell that is not included to the whitelist to ensure that the UE obtain the access to the CSG cell.

For example, assume that the UE 106 camping on the macro cell 104 subscribes to the CSG cell 108. The CSG cell 110 is mostly suitable for serving the UE 106 but not included in the whitelist of the UE 106. According to the prior art, when the UE 106 subscribes the CSG cell 110, the UE 106 cannot access the CSG cell 110 until access is granted after the UE 106 initiates the attach procedure or the tracking area updating procedure, possibly causing a great delay. According to the process 30 of the present invention, the MME 110, as well as a network, actively updates the whitelist of the UE 106 when the UE 106 subscribes the CSG cell 110 with an immediate request for initiation of the attach procedure or the tracking area updating procedure. Thus, the UE receives the access to the CSG cell with less delay.

Please note that, those skills in the art can determine content of the up-to-date whitelist and the way for the UE to include the CSG cell that is not included in the original whitelist. Taking an example for saving radio resources, the MME can create the up-to-date whitelist only including the CSG cell that is not included in the whitelist. Accordingly, the UE adds this CSG cell in the up-to-date whitelist to the original whitelist. Compared to the process 30, transmission of such an up-to-date whitelist contains less information quantity and therefore saves more radio resources.

Figure 4:
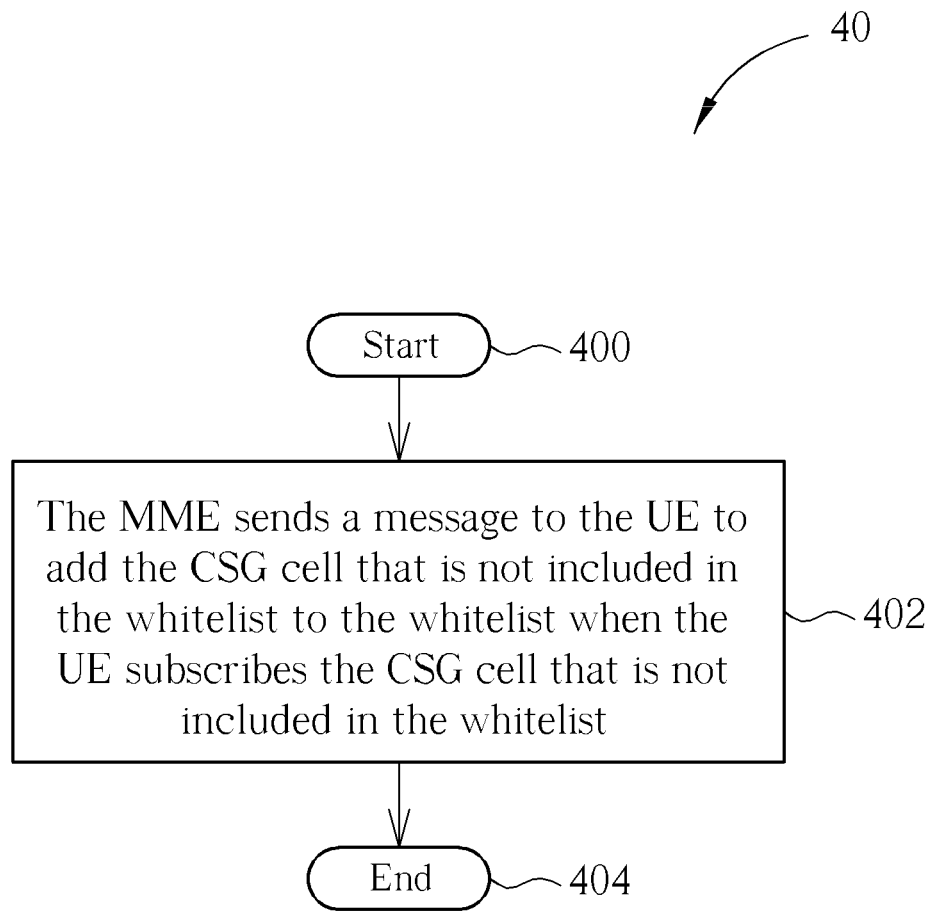
FIG. 4 is a flowchart of a process according to an embodiment of the present invention.

Please refer to FIG. 4, which illustrates a flowchart of a process 40 according to an embodiment of the present invention. The process 40 is applied to the NAS functions between a UE (ex. the UE 106) and a network (ex. the MME 110) for controlling CSG cell selection and can be compiled into the program code of the storage data 212. The process 40 includes the following steps:

Step 400: Start.

Step 402: The MME sends a message to the UE to add the CSG cell that is not included in the whitelist to the whitelist when the UE subscribes the CSG cell that is not included in the whitelist.

Step 404: End.

According to the process 40, the embodiment of the present invention requires the MME to directly send a message to the UE to add the CSG cell that is not included in the whitelist to the whitelist when the UE subscribes a CSG cell that is not included in the whitelist of the UE.

Preferably, the message is defined in the NAS function of a long term evolution (LTE) wireless system when the UE communicates with the E-UTRAN. Depended on different procedures, the message can be a SMS (shot message service), a CM SERVICE REJECT, a SERVICE REJECT, an ATTACH REJECT, a TRACKING AREA UPDATE REJECT, a ROUTING AREA UPDATE REJECT or a LOCATION UPDATING REJECT message. Please note that the UE can also be the control of a GSM EDGE radio access network (GERAN) or an UTRAN. In this situation, the message is realized with a SMS message.

Instead of updating the whitelist through the attach or tracking area updating procedure in the process 30, the MME of the process 40 updates the whitelist by directly sending a message. Compared to the process 30, the process 40 brings no interruptions to the services which the UE still receives when subscribing the CSG cell that is not included in the whitelist, and also saves more signaling resources.

Figure 5:
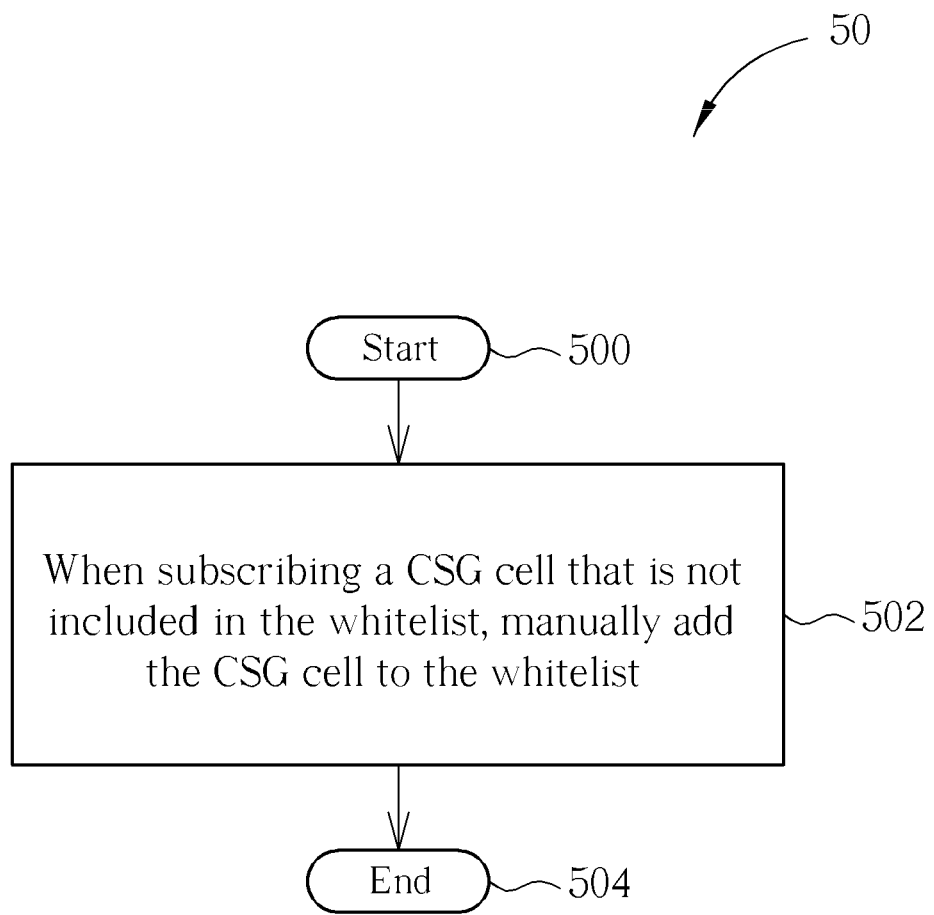
FIG. 5 is a flowchart of a process according to an embodiment of the present invention.

Please refer to FIG. 5, which illustrates a flowchart of a process 50 according to an embodiment of the present invention. The process 50 is applied to a UE (ex. the UE 106) for controlling CSG cell selection and can be compiled into the program code of the storage data 212. The process 40 includes the following steps:

Step 500: Start.

Step 502: When subscribing a CSG cell that is not included in the whitelist, manually add the CSG cell to the whitelist.

Step 504: End.

According to the process 50, the embodiment of the present invention requires the UE to update the whitelist by itself when the UE subscribes the CSG cell that is not included in the whitelist. Instead of relying on the MME for the whitelist updating in the processes 30 and 40, the UE manually, actively adds the CSG cell to the whitelist and thus can access the CSG cell as soon as possible.

Figure 6:
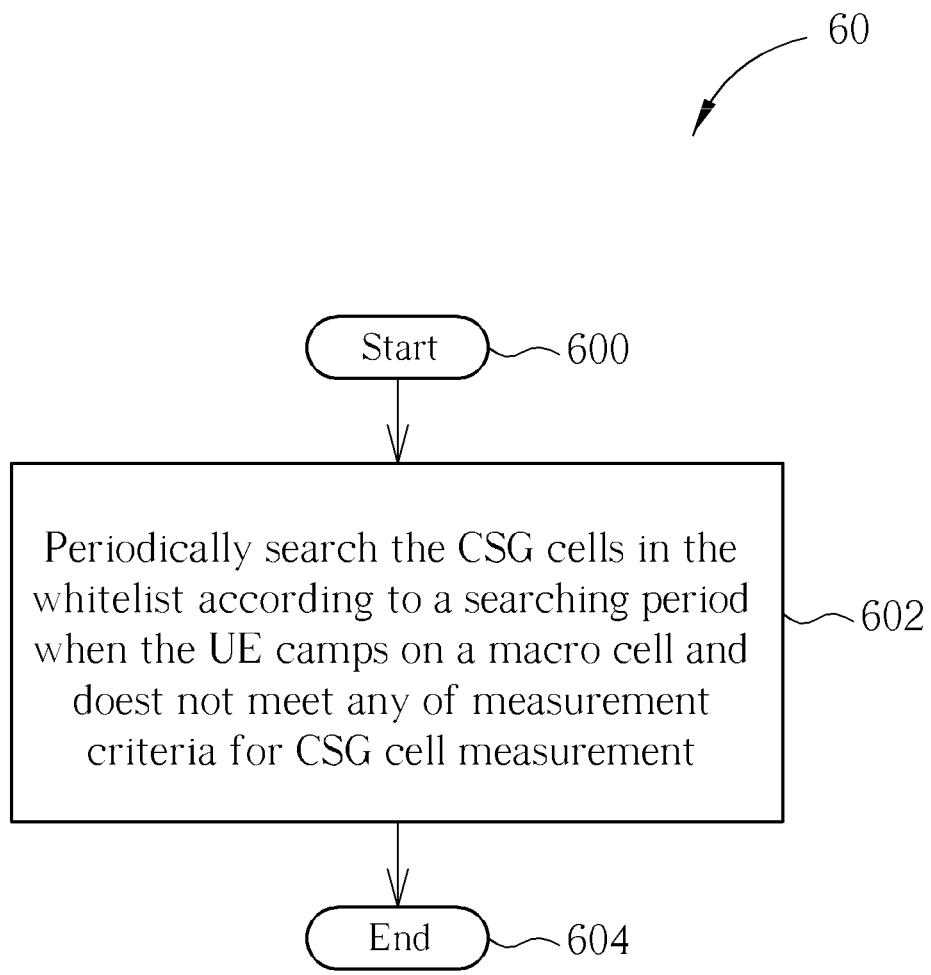
FIG. 6 is a flowchart of a process according to an embodiment of the present invention.

Please refer to FIG. 6, which illustrates a flowchart of a process 60 according to an embodiment of the present invention. The process 60 is applied to a UE (ex. the UE 106) for controlling CSG cell selection and can be compiled into the program code of the storage data 212. The process 60 includes the following steps:

Step 600: Start.

Step 602: Periodically search the CSG cells in the whitelist according to a searching period when the UE camps on a macro cell and doest not meet any of measurement criteria for CSG cell measurement.

Step 604: End.

According to the process 60, the UE periodically searches the CSG cells included in the whitelist when the UE camps on a non-CSG cell (ex. the macro cell 104) and doest not meet measurement criteria for CSG cell measurement.

Preferably, the searching period is configured by a network signaling message used for removing all CSG cells listed in the whitelist. The network signaling message can be an ATTACH ACCEPT message of the attach procedure or a TRACKING AREA UPDATE ACCEPT message of the tracking area updating procedure. A parameter of the searching period is stored in a SIM (Subscriber Identity Module) or a flash memory of the UE if the SIM does not support storage of the searching period. When the UE camps on the GERAN or UTRAN and the parameter of the searching period is stored in the SIM, the searching period is configured by an SMS message. In power consumption consideration, the searching period is set to several minutes, preferably about 5 minutes. In addition, the UE executes the periodical cell search in background operation and therefore does not impact the service operation, such as terminal call paging.

With the process 60, the UE can select a subscribed CSG cell with less delay. For example, assume that the UE 106 camps on a macro cell 104. According to the prior art, the UE 106 has a chance to reselect the CSG cell 108 as a serving cell only when any of the measurement criteria capable of triggering cell reselection is met. According to the process 60, although none of measurement criteria is met, the UE 106 begins to periodically search the CSG cells in the whitelist, and thereby can reselect the CSG cell 108 as the serving cell. From the above mentions, the fee of accessing services via a subscribed CSG cell is less than that of accessing services via a non CSG cell. In addition, the subscribed CSG cell can provide better communication quality due to a limited number of UE subscribers. Thus, though the process 60, the UE can enjoy the service with the better communication quality and less service charge.

Figure 7:
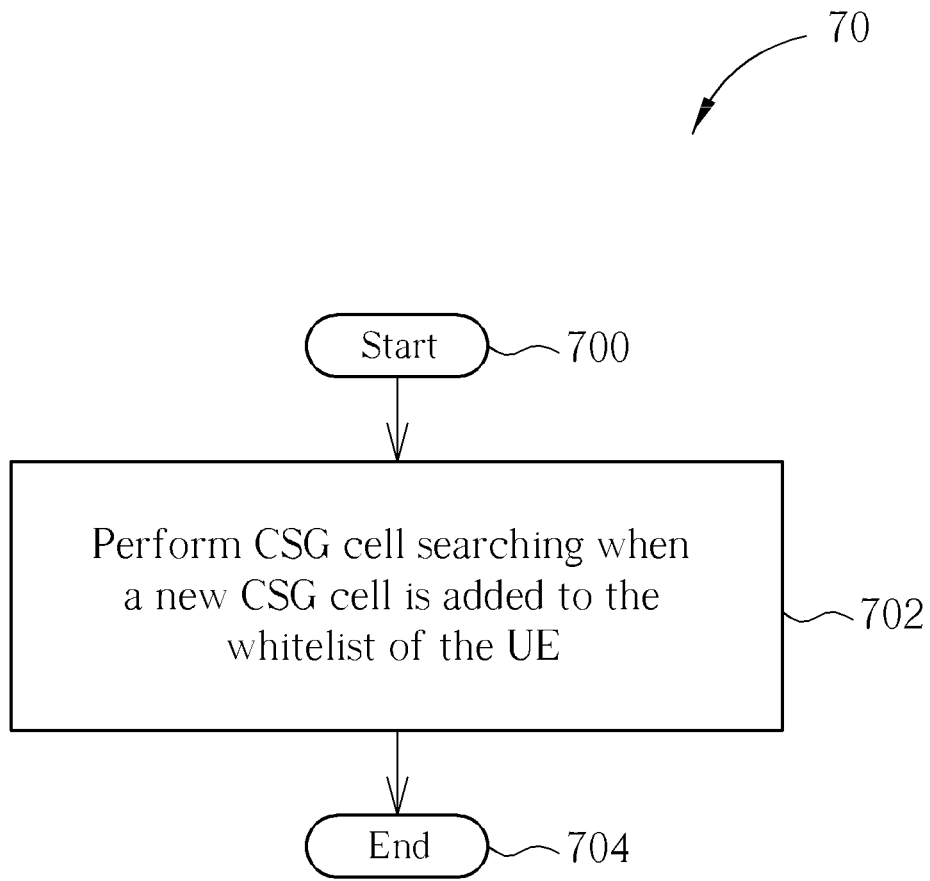
FIG. 7 is a flowchart of a process according to an embodiment of the present invention.

Please refer to FIG. 7, which illustrates a flowchart of a process 70 according to an embodiment of the present invention. The process 70 is applied to a UE (ex. the UE 106) for controlling CSG cell selection and can be compiled into the program code of the storage data 212. The process 70 includes the following steps:

Step 700: Start.

Step 702: Perform CSG cell searching when a new CSG cell is added to the whitelist of the UE.

Step 704: End.

According to the process 70, the UE starts a CSG cell search for the CSG cells included in the whitelist when a new CSG cell is added to the whitelist. In this situation, the UE can reselect a CSG cell to use even when none of the measurement criteria for CSG cell measurement is met. In addition, the UE stops the CSG cell searching when the CSG cell searching is done once and the new CSG cell cannot be found.

Figure 8:
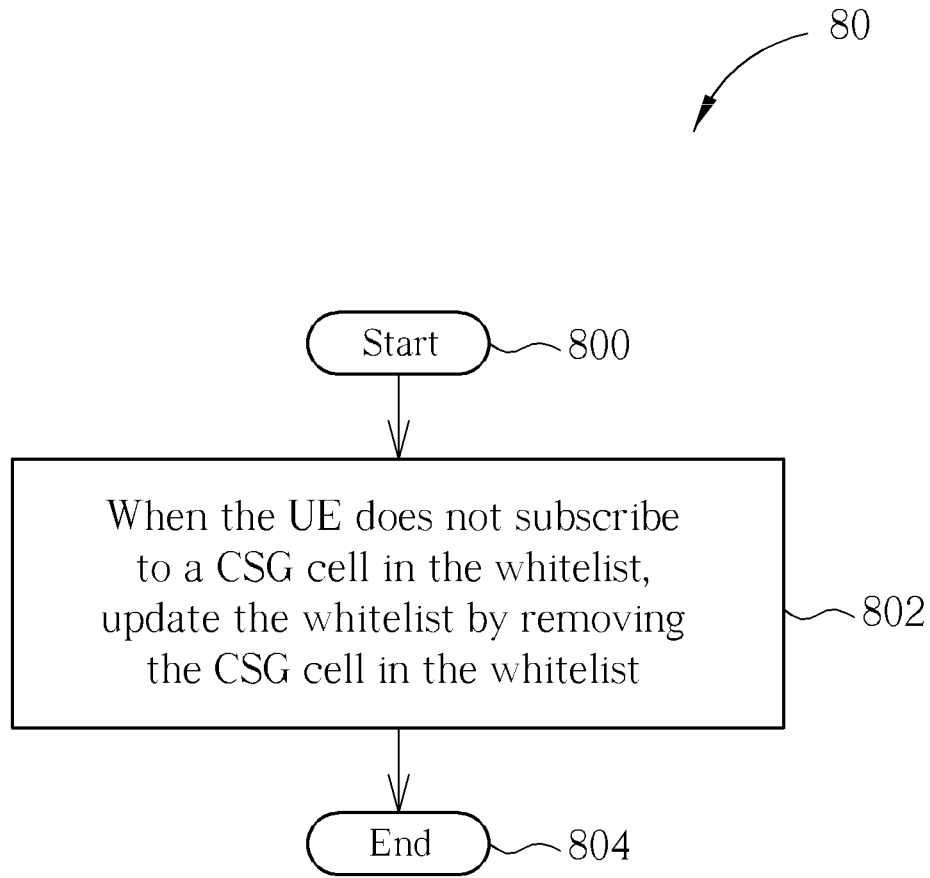
FIG. 8 is a flowchart of a process according to an embodiment of the present invention.

The CSG cells in the whitelist may not all be subscribed by the UE. In this situation, several processes are provided below to prevent the UE from misusing the CSG cell which the UE does not subscribe to. Please refer to FIG. 8, which illustrates a flowchart of a process 80 according to an embodiment of the present invention. The process 80 is applied to a network for managing a whitelist of a UE and can be compiled into the program code of the storage data 212. The process 80 includes the following steps:

Step 800: Start.

Step 802: When the UE does not subscribe to a CSG cell in the whitelist, update the whitelist by removing the CSG cell in the whitelist.

Step 804: End.

According to the process 80, when the UE does not subscribe to the CSG cell in the whitelist, the network updates the whitelist by removing the CSG cell. As a result, the UE does not search the unsubscribed CSG cell when next time performing cell search according to the updated whitelist.

To remove the CSG cell, preferably, the network first sends a detach message with a re-attach request to the UE when the UE does not subscribe to the CSG cell in the whitelist. In response to the re-attach request, the UE initiates an attach procedure. Through the attach procedure, the network sends an ATTACH ACCEPT message to the UE, and the ATTACH ACCEPT message includes an up-to-date whitelist excluding the unsubscribed CSG cell. Finally, the UE removes the CSG cell according to the up-to-date whitelist.

Another preferred way to remove the CSG cell is described as below. The network directly sends a message to the UE, and thereby the UE removes the CSG cell. The message is preferably used in a GERAN, an UTRAN, or a NAS function of SAE for the LTE wireless system or). The message can be a SMS (shot message service), a CM SERVICE REJECT, a SERVICE REJECT, an ATTACH REJECT, a TRACKING AREA UPDATE REJECT, a ROUTING AREA UPDATE REJECT or a LOCATION UPDATING REJECT message.

In addition to the process 80, the CSG cell can also be manually removed from the whitelist when the UE does not subscribe to the CSG cell in the whitelist.

Figure 9:
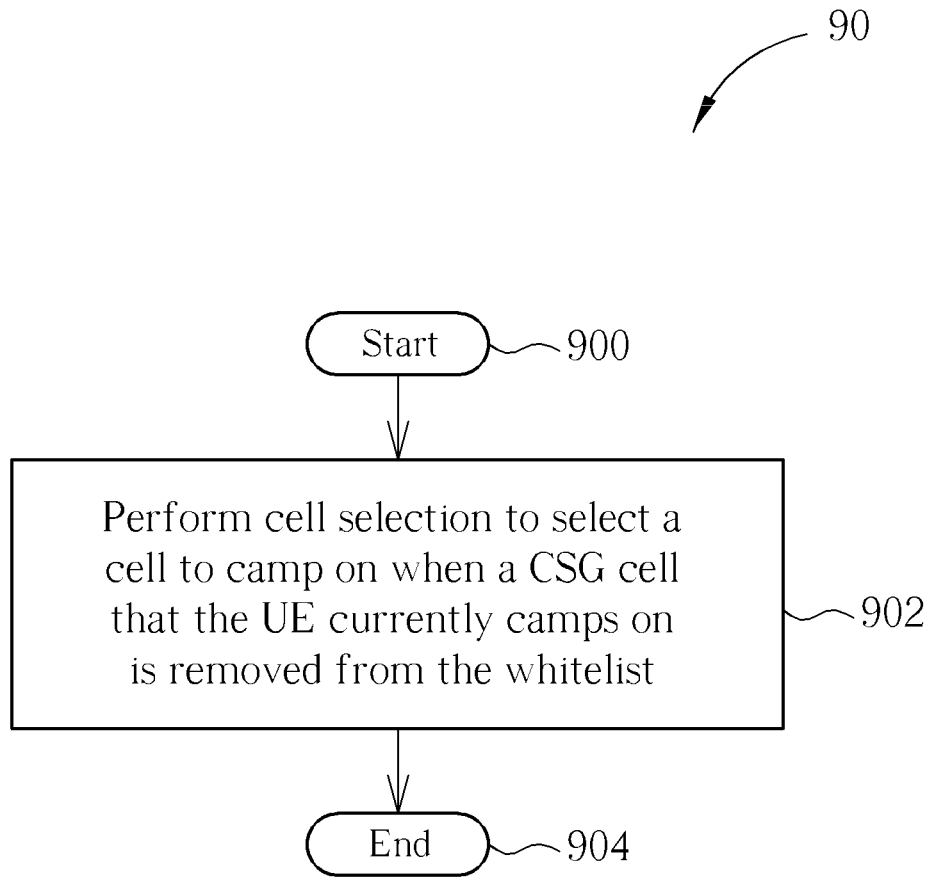
FIG. 9 is a flowchart of a process according to an embodiment of the present invention.

The embodiment of the present invention further provides processes for the UE when the unsubscribed CSG cell is removed from the whitelist. Please refer to FIG. 9, which illustrates a flowchart of a process 90 according to an embodiment of the present invention. The process 90 is applied to a UE for controlling CSG cell selection corresponding to a whitelist of the UE and can be compiled into the program code of the storage data 212. The process 90 includes the following steps:

Step 900: Start.

Step 902: Perform cell selection to select a cell to camp on when a CSG cell that the UE currently camps on is removed from the whitelist.

Step 904: End.

According to the process 90, the UE performs cell selection to select a new cell to camp on when the currently-camped CSG cell is removed from the whitelist. The selected cell is never the currently-camped CSG cell and can be a CSG or normal cell. Through the process 90, the UE actively selects another cell to camp on when the currently camped CSG cell is removed from the whitelist.

Figure 10:
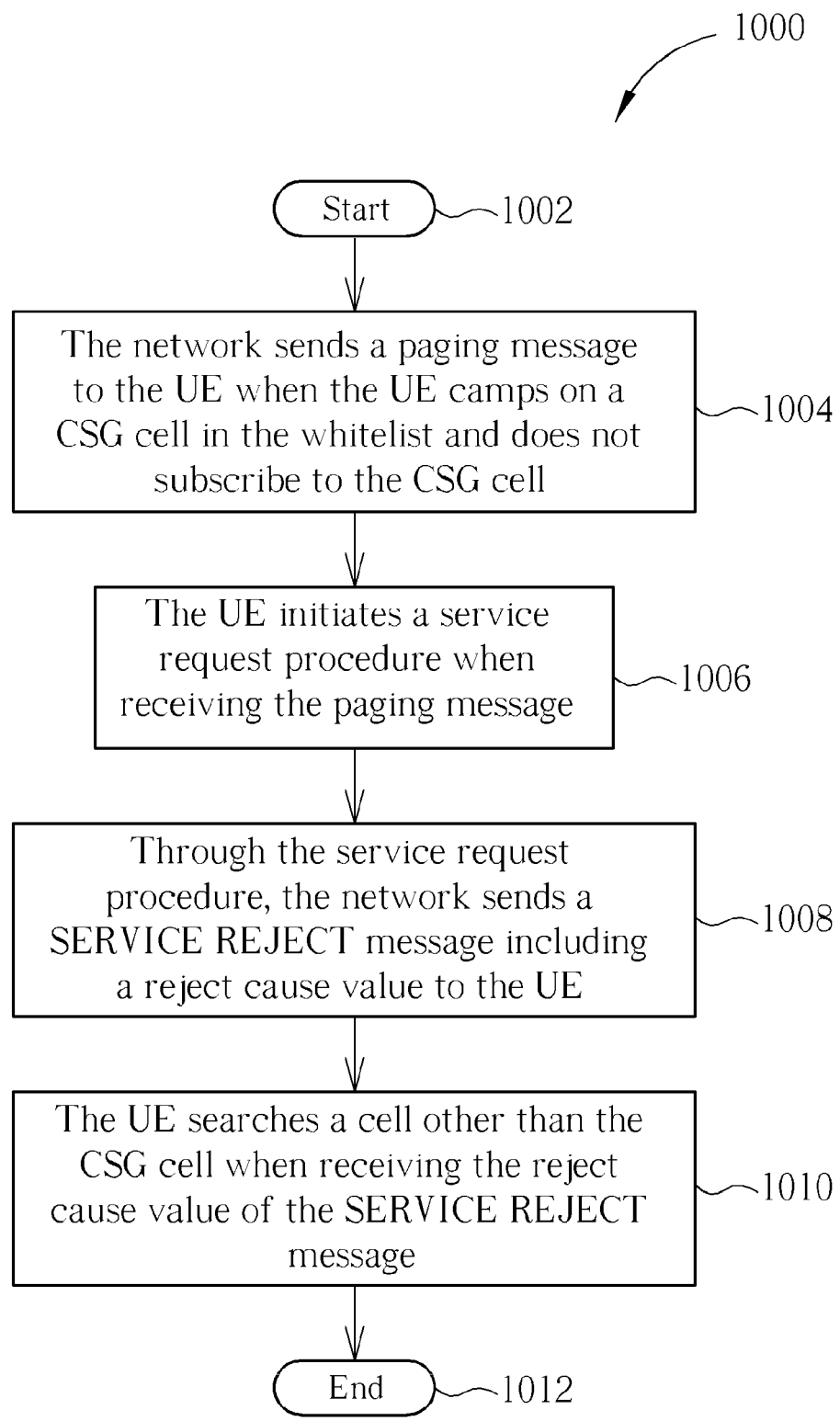
FIG. 10 is a flowchart of a process according to an embodiment of the present invention.

Please refer to FIG. 10, which illustrates a flowchart of a process 1000 according to an embodiment of the present invention. The process 1000 is utilized for a UE and a network to control CSG cell selection corresponding to a whitelist of the UE and can be compiled into the program code of the storage data 212. The process 1000 includes the following steps:

Step 1002: Start.

Step 1004: The network sends a paging message to the UE when the UE camps on a CSG cell in the whitelist and does not subscribe to the CSG cell.

Step 1006: The UE initiates a service request procedure when receiving the paging message.

Step 1008: Through the service request procedure, the network sends a SERVICE REJECT message including a reject cause value to the UE.

Step 1010: The UE searches a cell other than the CSG cell when receiving the reject cause value of the SERVICE REJECT message.

Step 1012: End.

According to the process 1000, when the UE does not subscribe to the currently camped CSG cell, the network sends the paging message. When receiving the paging message, the UE initiates the service request procedure where the network sends the SERVICE REJECT message including the reject cause value utilized for triggering the UE to search the cell other than the currently camped CSG cell. Thus, through the process 1000, the network can actively require the UE to search another cell to camp on when the UE does not subscribe to the currently camped CSG cell.

Preferably, the searched cell is a CSG cell or a normal cell. The reject cause value is 15. The currently camped CSG cell and the searched cell belong to different defined area in the same or different PLMN. The defined area can be a routing area, a tracking area, or a location area. In this situation, when the cell in another routing, tracking, or location area is searched and found, the UE accordingly initiates a tracking, a routing, or a location update procedure. Through the procedure initiated by the UE, the network sends a TRACKING AREA UPDATE ACCEPT, a ROUTING AREA UPDATE ACCEPT, or a LOCATION UPDATING ACCEPT message to the UE. Any of the messages include an up-to-date whitelist excluding the CSG cell in the whitelist so that the UE removes the currently camped CSG cell from the whitelist according to the up-to-date whitelist.

In a special case where the searched cell belong to another location area of the GERAN or the UTRAN in the different or same PLMN as the currently camped CSG cell, the UE initiates the location or the routing area update procedure instead of any of the three types of area update procedures. In this situation, the network sends the ROUTING AREA UPDATE ACCEPT or a LOCATION UPDATE ACCEPT message according to the initiated process to trigger the UE to the currently camped CSG cell from the whitelist.

Thus, the process 1000 specifies the UE to move to another cell and removes the currently-camped CSG cell from the whitelist when the currently-camped CSG cell is included in the whitelist and not subscribed by the UE.

The processes 30-50 solve the first problems of the prior art by means of the fast update of the whitelist. The processes 60 and 70 solve the second problems of the prior art by means of periodical cell searching and cell searching in response to the whitelist update respectively. The processes 80-90, 1000 provides actions for the UE to deal with a situation where the UE camps on an unsubscribed CSG cell, and a related situation where the currently camped CSG cell is removed from the whitelist.

In conclusion, the embodiments of the present invention improve the CSG cell selection for the UE and avoid possible system errors.

Those skilled in the art will readily observe that numerous modifications and alterations of the device and method may be made while retaining the teachings of the invention.

What is claimed is:

1. A method of controlling closed subscriber group, hereinafter called CSG, cell selection for a user equipment, hereinafter called UE, used in a wireless communication system comprising a network, the UE comprising a whitelist capable of providing a list of accessible CSG cells, the method comprising:

updating the whitelist when the UE subscribes to a CSG cell that is not included in the whitelist or does not subscribe to a CSG cell in the whitelist, wherein updating the whitelist comprises:
receiving a first message from the network; and
adding the CSG cell not included in the whitelist to the whitelist according to the first message when the UE subscribes to the CSG cell not included in the whitelist, or removing the CSG cell from the whitelist according to the first message when the UE does not subscribe to the CSG cell in the whitelist.

2. The method of claim 1, wherein the CSG cell is manually added to the whitelist or manually removed from the whitelist.

3. The method of claim 1, wherein the first message is an ATTACH ACCEPT message comprising an up-to-date whitelist comprising the CSG cell that is not included in the whitelist, and the ATTACH ACCEPT message is received through an attach procedure initiated by the UE in response to a re-attach request sent from the network.

4. The method of claim 1, wherein the first message is a short message service (SMS) message, CM SERVICE REJECT message, a SERVICE REJECT message, a ATTACH REJECT message, a TRACKING AREA UPDATE REJECT message, a ROUTING AREA UPDATE REJECT message or a LOCATION UPDATING REJECT message.

5. The method of claim 1, wherein the first message is an ATTACH ACCEPT message comprising an up-to-date whitelist excluding the CSG cell to be removed, and the ATTACH ACCEPT message is received through an attach procedure initiated by the UE in response to a re-attach request sent from the network.

6. A method of controlling CSG (Closed Subscriber Group) cell selection for a user equipment of a wireless communication system, the user equipment (UE) comprising a whitelist capable of providing a list of accessible CSG cells, the method comprising:

performing CSG cell searching when a new CSG cell is added to the whitelist, such that the UE is able to reselect the new CSG cell even though none of cell reselection criteria for the new CSG cell measurement is met or none of measurement criteria for the new CSG cell measurement is met.

7. The method of claim 6 further comprising stopping the CSG cell searching when the CSG cell searching is done once and the CSG cell cannot be found.

8. A method of controlling CSG (closed subscriber group) cell selection for a user equipment, hereinafter called UE, used in a wireless communication system with a network, the UE comprising a whitelist capable of providing a list of accessible CSG cells, the method comprising:

receiving a paging message from the network when the UE camps on a CSG cell in the whitelist and does not subscribe to the CSG cell;
initiating a service request procedure when the paging message is received;

through the service request procedure, receiving a SERVICE REJECT message comprising a reject cause value from the network; and searching a cell other than the CSG cell when the reject cause value of the SERVICE REJECT message is received.

9. The method of claim 8, wherein the CSG cell belongs to a first defined area, and the UE searching the cell other than the CSG cell when the reject cause value of the SERVICE REJECT message is received comprises:

searching the cell in a second defined area.

10. The method of claim 9 further comprising:

initiating an area update procedure when the cell in the second defined area is searched and found;

through the area update procedure, receiving a first message from the network, the first message comprises an up-to-date whitelist excluding the CSG cell in the whitelist; and removing the CSG cell from the whitelist according to the up-to-date whitelist.

11. The method of claim 10, wherein the first defined area is a tracking area, a routing area or a location area, the second defined area is a tracking area, a routing area or a location area, the area update procedure is a tracking area update procedure, a location area update procedure or a routing area update procedure, and the first message is a TRACKING AREA UPDATE ACCEPT message, a LOCATION UPDATING ACCEPT message, or a ROUTING AREA UPDATE ACCEPT message.

12. The method of claim 10, wherein the second defined area is a location area of a GSM/EDEG radio access network or a UMTS radio access network in a same public land mobile network as the first defined area, the area update procedure is a location area update procedure or a routing area update procedure, and the first message is a LOCATION UPDATE ACCEPT message or a ROUTING AREA UPDATE ACCEPT message.

13. A method of controlling closed subscriber group, CSG, cell selection for a network of a wireless communication system, the method comprising:

sending a paging message to a user equipment, UE, of the wireless communication system, the UE comprising a whitelist capable of providing a list of accessible CSG cells, wherein the UE camps on a CSG cell in the whitelist and does not subscribe to this CSG cell; and sending a SERVICE REJECT message including a reject cause value to the UE when UE initiates a SERVICE REQUEST procedure in response to the paging message, such that the UE has to search a cell other than the currently camped CSG cell when the reject cause value of the SERVICE REJECT message is received by the UE.

* * * * *